US005212815A

United States Patent [19]

Schumacher

[11] Patent Number: 5,212,815

[45] Date of Patent: May 18, 1993

[54] RADIO EQUIPMENT DIRECTIONAL COUPLER

[75] Inventor: Lawrence R. Schumacher, Hoffman Estates, Ill.

[73] Assignee: Motorola, Inc., Schaumburg, Ill.

[21] Appl. No.: 753,530

[22] Filed: Sep. 3, 1991

[51] Int. Cl.$^5$ .......................... H04B 1/04; H01P 5/18

[52] U.S. Cl. .................................... 455/126; 333/116; 333/204; 455/80

[58] Field of Search ........................ 333/115, 116, 204; 455/126

[56] References Cited

U.S. PATENT DOCUMENTS

| | | | |
|---|---|---|---|
| 3,641,451 | 2/1972 | Hollingsworth et al. . | |
| 3,656,162 | 4/1972 | Mee . | |
| 3,662,294 | 5/1972 | Jacobs et al. | 333/33 |
| 3,866,136 | 2/1975 | Augustin et al. . | |
| 4,027,254 | 5/1977 | Gunton et al. | 333/116 X |
| 4,074,214 | 2/1978 | Aicholzer . | |
| 4,382,238 | 5/1983 | Makimoto et al. | 333/134 |
| 4,418,324 | 11/1983 | Higgins | 333/204 |
| 4,644,260 | 2/1987 | Warder . | |
| 4,703,291 | 10/1987 | Nishikawa et al. | 333/202 |
| 4,785,271 | 11/1988 | Higgins, Jr. | 333/204 |
| 4,809,356 | 2/1989 | Peckham et al. . | |
| 4,823,098 | 4/1989 | DeMuro et al. | 333/206 |
| 5,006,821 | 4/1991 | Tam | 333/116 |
| 5,015,972 | 5/1991 | Cygan et al. | 333/32 |
| 5,023,866 | 6/1991 | De Muro | 370/24 |

FOREIGN PATENT DOCUMENTS

| | | | |
|---|---|---|---|
| 2419613 | 11/1979 | France | 333/116 |
| 884008 | 11/1981 | U.S.S.R. | 333/116 |

OTHER PUBLICATIONS

S. Cohn, "Shielded Coupled-Strip Transmission Line," IRE Transactions on Microwave Theory and Techniques, vol. MTT-3, No. 5, Oct. 1955, pp. 29-38.

S. Cohn, "Characteristic Impedances of Broadside-Coupled Strip Transmission Lines", IRE Transactions on Microwave Theory & Techniques, Nov. 1960 pp. 633-637.

J. Sheldton, Jr., "Impedances of Offset Parallel-Coupled Strip Transmission Lines", IEEE Transactions on Microwave Theory and Techniques, Jan. 1966, pp. 7-15.

*Primary Examiner*—Paul Gensler

*Attorney, Agent, or Firm*—Raymond A. Jenski; Rolland R. Hackbart

[57] ABSTRACT

A directional coupler (103) for radio equipment couples a radio frequency signal from an input of a microstrip transmission line (309) to an output and provides a directionally coupled output via a stripline microstrip (311). Open circuit microstrip transmission line stubs (313 and 315) are tuned to a quarter wavelength of the third harmonic of the radio frequency to provide third harmonic rejection within the directional coupler.

13 Claims, 2 Drawing Sheets

FIG. 1
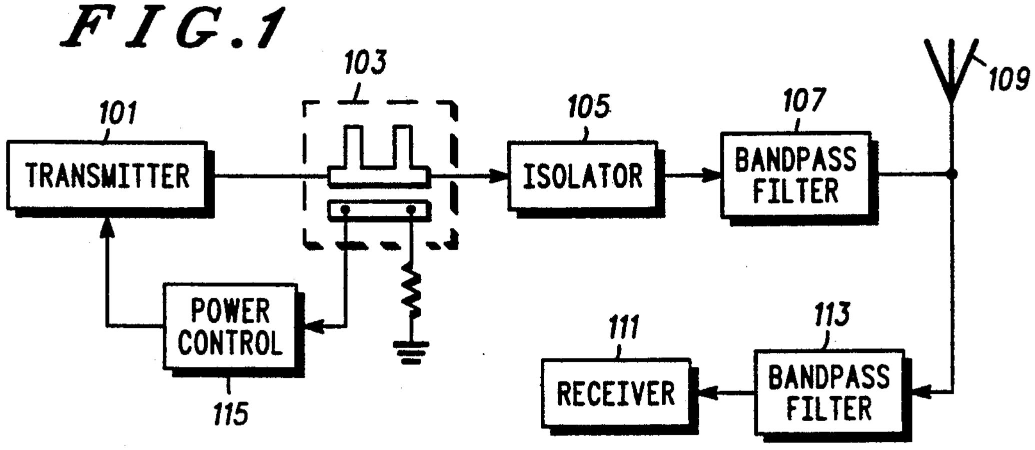
FIG. 2
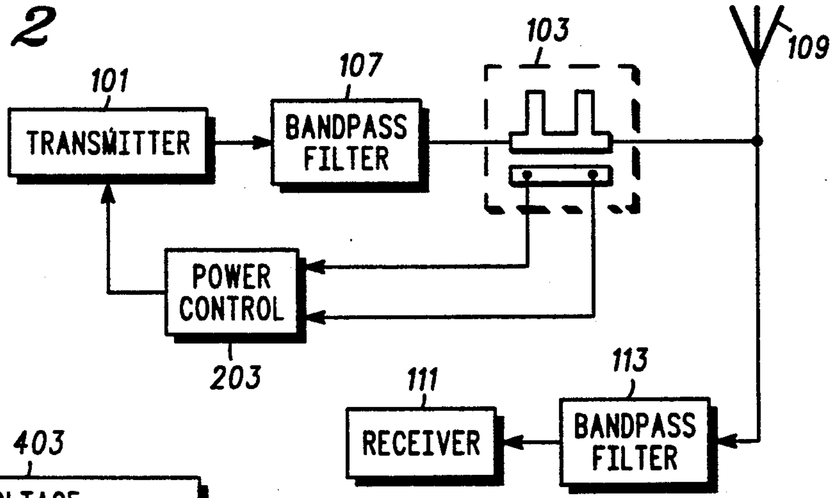
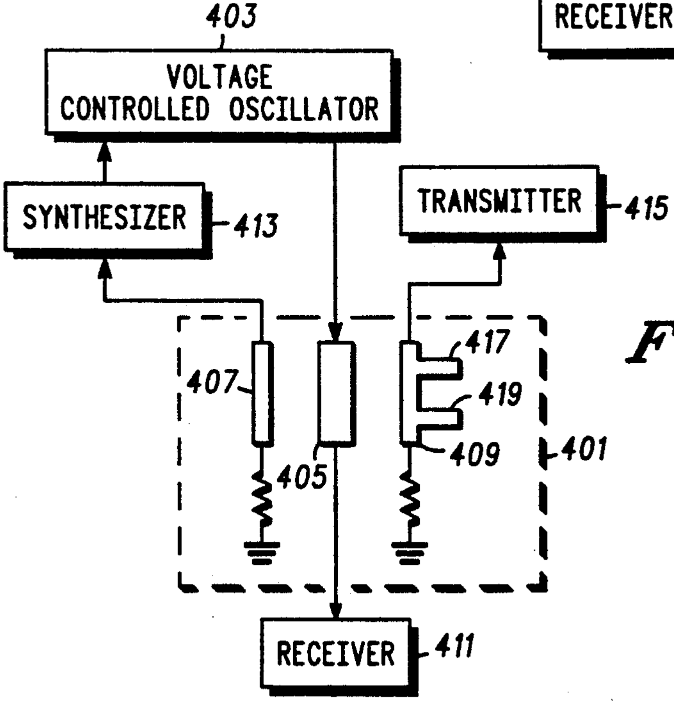
FIG. 4

RADIO EQUIPMENT DIRECTIONAL COUPLER

BACKGROUND OF THE INVENTION

The present invention generally relates to directional couplers for radio frequency equipment and more particularly relates to a radio frequency directional coupler having an integral filter for reducing undesired components of a signal input to the coupler.

A well known element for radio frequency equipment is a directional coupler. This device allows a sample of a radio frequency signal, which is input at an input terminal and output at an output terminal, to be extracted from the input signal. Properly designed, the directional coupler can distinguish between a signal input at the input terminal and a signal input at the output terminal. This characteristic is of particular use in a radio frequency transmitter in which both the input signal and a signal which is reflected from a mismatched antenna can be independently monitored. One or the other or both of these signals can be utilized in a power control circuit to control the output power of the transmitter.

Another element well known in the output circuit of a transmitter is a harmonic filter, which is employed to reduce the energy coupled to an antenna at harmonic frequencies of the desired output signal. In a system which consists of a transmitter coupled to an antenna, the harmonic filter can be relatively simple lowpass filter, but in a system where the transmitter must share the same antenna with other equipment, for example a companion receiver, the harmonic filter may take on a somewhat more complex configuration. For example, a bandpass filter which passes only a relatively narrow band of frequencies at which the transmitter is designed to operate while rejecting all other frequencies has been used in critical applications such as cellular radiotelephones. In order to achieve the lowest insertion loss within the smallest practical size, frequency resonant structures such as helical or coaxial resonators have been the choice of radio equipment designers. Unfortunately, resonant structures experience a reduction in their attenuation characteristics at frequencies which are approximately odd order harmonics of the passband frequency. Such a response is known as flyback. In order to overcome the flyback response, equipment designers have placed additional filtering in series with the resonant structure bandpass filter. One example of this additional filtering may be found in U.S. Pat. No. 5,023,866.

A radio equipment designer wishing to design high performance radio equipment may elect to employ a directional coupler, a resonant structure bandpass filter and a odd order harmonic flyback filter but heretofore has been constrained to use conventionally realized individual circuit elements. Such a configuration, with individual circuit elements, can experience potentially higher failure rates and increased size and cost of equipment.

SUMMARY OF THE INVENTION

The present invention encompasses a directional coupler for radio equipment in which a radio signal may be coupled to the input port of a first transmission line and coupled therefrom to a first port of a second transmission line such that a portion of the radio signal is output at said first port. A third transmission line, having an electrical length equal to an integer multiple of a quarter wavelength of an undesired component of said radio signal, is coupled to said first transmission line such that the undesired component is diminished at the output port of the first transmission line.

BRIEF DESCRIPTION OF THE DRAWINGS

FIG. 1 is a block diagram of a radio transceiver which may employ the present invention.

FIG. 2 is a block diagram of an alternative radio transceiver design which may employ the present invention.

FIG. 4 is a block diagram of a three way power splitter circuit utilized in a transceiver and which may employ the present invention.

DESCRIPTION OF A PREFERRED EMBODIMENT

Figure 3:
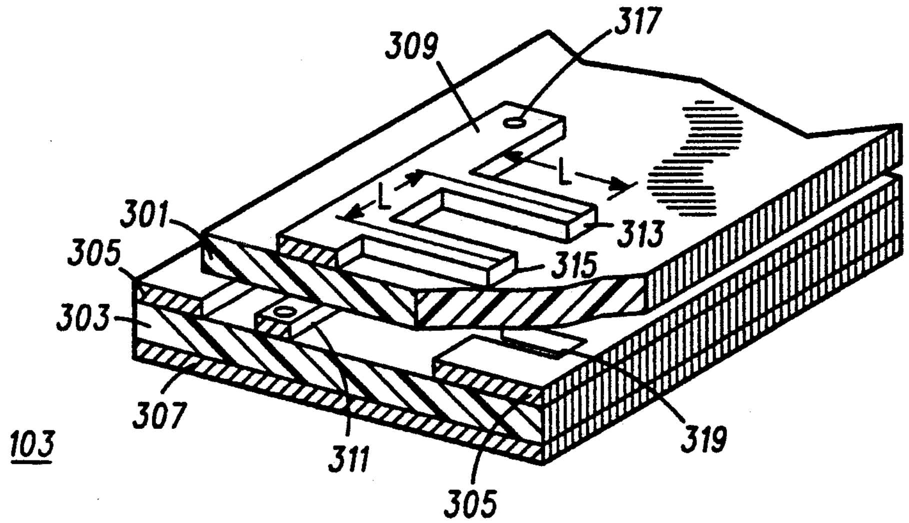
FIG. 3 is an isometric diagram of a directional coupler which may employ the present invention.

A transceiver utilizing the directional coupler of the present invention is shown in block diagram form in FIG. 1. A radio transmitter 101, of conventional design for radiotelephone use, is coupled to the input of directional coupler 103, the output of which (after a minimum amount of attenuation to the fundamental of the output signal from transmitter 101) is coupled to a conventional isolator 105. The isolator 105 in the preferred embodiment reduces the amount of reflected power conveyed back to the transmitter 101 caused by impedance mismatches in bandpass filter 107 or the antenna 109 or from transmissions from a nearby transmitter. It is an option of the designer to delete isolator 105 if reflected power is not considered to be a problem in the design of the overall transmitter. The isolator is coupled to a bandpass filter 107, which in the preferred embodiment is a ceramic block dielectric resonator bandpass filter, which yields low insertion loss in the passband of the fundamental frequency output from the transmitter 101 while providing significant attenuation to undesired signals outside the passband of the filter. Bandpass filter 107 is coupled to antenna 109.

The receiver 111 constitutes the other portion of the transceiver and receives radio frequency signals from antenna 109 which have been selected by bandpass filter 113.

Directional coupler 103 provides a sample of the transmitter output signal which is attenuated by 12 dB and coupled from a forward power port to a power control circuit 115 which conventionally rectifies and processes the sampled output signal. The output of the power control circuit 115 is a control signal to transmitter 101 for the purpose of providing a transmitter output signal which is maintained within a certain tolerance from a desired power level. The other coupled port in the embodiment shown in FIG. 1 (which couples a portion of the power reflected, if any, to circuitry outside of the directional coupler 103) is not used in the embodiment of FIG. 1.

An alternative design of a transceiver employing the directional coupler 103 is shown in block diagram form in FIG. 2. The position of the directional coupler 103 is rearranged so that signals output from bandpass filter 107 are coupled to the input of directional coupler 103 and the output of directional coupler 103 is coupled to the antenna 109. The reflected power port of directional coupler 103 in this embodiment is also coupled to a power control circuit 203 where the reverse power signal is rectified and employed in further controlling the output power of the transmitter 101.

Realization of the directional coupler 103 having band reject performance which enhances the operation of the bandpass filter 107 is shown in the isometric diagram of FIG. 3. Two dielectric substrates 301 and 303 having a dielectric constant of 4.5, are laminated together with a conductive metallization 305 sandwiched between the two substrates. Furthermore, a conductive area 307 is applied to one outer surface of the laminated substrates and other metallization may be applied to the other outer surface of the laminated substrates. General construction of multiple conductive layers is relatively well known as a multilayer printed circuit board.

In the realization of the directional coupler of the preferred embodiment, a microstrip conductor pattern 309 is disposed on one outer surface of the multilayer circuit board and a stripline conductor circuit is disposed on the inner or sandwiched layer of the multilayer circuit board. The microstrip 309 utilizes as its effective ground the conductor layer 307 disposed on the opposite outer surface of the multilayer printed circuit board. The stripline 311 utilizes, as its effective ground, the conductive layer 307 and the microstrip 309. In the preferred embodiment, the conductor layer 305 (also disposed on the inner layer) is maintained a distance of at least 0.25 centimeters from the stripline conductor 311.

When the directional coupler 103 is employed in a radio transceiver operating in a band of frequencies from approximately 940 MHz to 960 MHz, it is desirable to reject a band of frequencies equal to the third harmonic of the desired band of frequencies. This additional rejection offered by the directional coupler 103 enhances the operation of the ceramic bandpass filter 107 at approximately the third harmonic (2.820 GHz to 2.880 GHz). Two open circuit stubs 313 and 315 are attached to the microstrip between the input terminal 317 and the output terminal (not shown). When constructed on a multilayer printed circuit board having one ounce copper metalization (0.0036 centimeter thickness copper) the microstrip 309 length is 1.78 centimeters with a width of 0.22 centimeters. The stripline 311, in the preferred embodiment, is located in the sandwiched layer directly beneath the microstrip 309 and spaced from it 0.053 centimeters, the thickness of the dielectric material 301. The stripline 311 is 1.5 centimeters long and 0.05 centimeters wide. These dimensions provide microstrip and stripline characteristic impedances of 50 ohms.

The microstrip transmission line stubs 313 and 315, in the preferred embodiment, are open circuited quarter wave transmission line stubs designed with a width as narrow as possible to obtain minimum insertion loss to the desired fundamental frequency output from transmitter 101. Each of the transmission line stubs 313 and 315 have a length L of 1.56 centimeters and a width of 0.013 centimeters, thus providing a characteristic impedance of 137 ohms as a microstrip transmission line referenced to the conductive layer 307 for each transmission line. (A notch 319 is left in the conductor layer 305 opposite stub 315 and a notch (not shown) is left in the conductor layer 305 opposite stub 313 so that the transmission line ground reference is relative to the conductive layer 307). Since, in the preferred embodiment, each of the stubs 313 and 315 are open circuited at the third harmonic of the desired fundamental frequency, the resulting effect at the microstrip transmission line 309 at the third harmonic is one of a short circuit. Spacing the stubs 313 and 315 from each other a distance of a quarter wavelength at the third harmonic (L) between the input port 317 of microstrip 309 and the output port yields high attenuation at the third harmonic and low insertion loss at the fundamental. Furthermore, third harmonic attenuation is also presented to the signal coupled from the stripline 311. This feature can be utilized in power splitting implementations of the present invention.

Although not used in the preferred embodiment, the filter stubs may be adjusted to provide rejection at different frequencies, such as the third and fifth harmonics. The filter stubs may also be adjusted to provide rejection at other undesired frequencies other than at frequencies harmonically related to the fundamental frequency. Further use of the directional coupler of the present invention may be found in a three way power splitting network such as shown in the block diagram of FIG. 4. The three way power splitter 401 accepts an input signal from a voltage controlled oscillator 403 to a main coupling stripline transmission line 405 from which the signal from the voltage controlled oscillator 403 is coupled to two microstrip transmission lines 407 and 409. Output from stripline 405 is coupled to a receiver 411 while output from coupled microstrip line 407 is input to a frequency synthesizer 413 for controlling the frequency of the voltage controlled oscillator 403. An output from microstrip transmission line 409 is input to a transmitter 415. Transmission line stubs 417 and 419 are tuned, as quarter wave transmission line stubs, to a harmonic of the frequency of the signal output from the voltage controlled oscillator 403 to eliminate this harmonic from being input to the transmitter 415.

Figure 5:
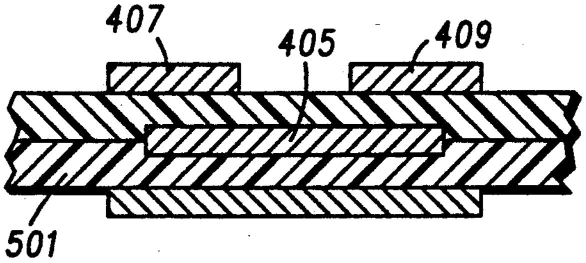
FIG. 5 is a cross sectional diagram of the three way power splitter of FIG. 4.

A cross-section of the directional coupler 401 is shown in FIG. 5. A multilayer substrate 501 includes the main stripline transmission line 405 as the center metallization and microstrip lines 407 and 409 (including the transmission line stubs 417 and 419) on a top surface of the substrate. The ground conductor is disposed on the bottom surface of the substrate 501.

What is claimed is:

1. A directional coupler for radio equipment, comprising:

a first transmission line having an input port to which a radio signal may be applied and an output port;

a second transmission line having at least a first port and coupled primarily to said first transmission line such that an attenuated portion of said radio signal is output at said first port; and a third transmission line having a distal end disposed away from said second transmission line, coupled at a proximal end primarily to said first transmission line and having an electrical length equal to an integer multiple of a quarter wavelength of an undesired component of said radio signal, whereby said undesired component is diminished at least at said output port.

2. A directional coupler in accordance with claim 1 further comprising an essentially planar substrate having two sides, a first side having disposed thereon said first transmission line and a second side having disposed thereon said second transmission line, said first and second transmission lines oriented essentially opposite each other.

3. A directional coupler in accordance with claim 2 further comprising a conductive area disposed on said second side but spaced apart from said second transmission line, whereby coupling between said first transmission line and said conductive area is reduced.

4. A directional coupler in accordance with claim 2 further comprising a second essentially planar substrate having first and second sides, said first side of said second planar substrate contacting said second transmission line and said second side of said second planar substrate being having a conductive material disposed at least opposite said first, second, and third transmission lines.

5. A directional coupler in accordance with claim 1 further comprising a fourth transmission line having an electrical length equal to an integer multiple of a quarter wavelength of said undesired component of said radio signal and coupled to said first transmission line at a location disposed an integer multiple of a quarter wavelength of said undesired component of said radio signal from the location of coupling of said third transmission line to said first transmission line.

6. A radio transmitter employing a directional coupler to couple the radio frequency output signal of the transmitter to an antenna and provide a signal representative of the coupled radio frequency output signal to a controller which controls the power of the radio frequency output signal, the directional coupler comprising:

- a first transmission line having an input port coupled to the transmitter and an output port coupled to the antenna;
- a second transmission line, coupled primarily to said first transmission line and having a first port coupled to the controller to provide a portion of said radio frequency output signal to the controller; and
- a third transmission line coupled primarily to said first transmission line and having an electrical length equal to an integer multiple of a quarter wavelength of an undesired component of said radio frequency output signal, whereby said undesired component is diminished at least at said output port.

7. A radio transmitter in accordance with claim 6 further comprising an essentially planar substrate having two sides, a first side having disposed thereon said first transmission line and a second side having disposed thereon said second transmission line, said first and second transmission lines oriented essentially opposite each other.

8. A radio transmitter in accordance with claim 7 further comprising a conductive area disposed on said second side but spaced apart from said second transmission line, whereby coupling between said first transmission line and said conductive area is reduced.

9. A radio transmitter in accordance with claim 7 further comprising a second essentially planar substrate having first and second sides, said first side of said second planar substrate contacting said second transmission line and said second side of said second planar substrate being having a conductive material disposed at least opposite said first, second, and third transmission lines.

10. A radio transmitter in accordance with claim 6 further comprising a fourth transmission line having an electrical length equal to an integer multiple of a quarter wavelength of an undesired component of said radio frequency output signal and coupled to said first transmission line at a location disposed an integer multiple of a quarter wavelength of an undesired component of said radio frequency output signal from the location of coupling of said third transmission line to said first transmission line.

11. A radio frequency power coupler comprising:

- a multilayer substrate having at least first, second, and internal surfaces;
- a first conductive material disposed on said first surface;
- a first conductive pattern disposed on said second surface and opposite said first conductive material and further comprising;
  - (a) a first transmission line having an input port to which a radio frequency signal may be applied, and
  - (b) a second transmission line coupled primarily to said first transmission line at a predetermined location and having an electrical length equal to an integer multiple of a quarter wavelength of an undesired component of said radio signal, whereby said undesired component is diminished at least at said output port; and
- a second conductive pattern disposed on said internal surface essentially opposite said first conductive material, coupled primarily to said first conductive pattern, and having at least one output port, whereby an attenuated portion of said radio frequency signal is output at said at least one output port.

12. A radio frequency power coupler in accordance with claim 11 further comprising a third conductive pattern disposed on said internal surface, spaced apart from said second conductive pattern, and absent from areas of said internal surface opposite said second transmission line.

13. A radio frequency power coupler in accordance with claim 11 wherein said first conductive pattern further comprises a third transmission line having an electrical length equal to an integer multiple of a quarter wavelength of said undesired component of said radio signal and coupled to said first transmission line at a location disposed an integer multiple of a quarter wavelength of said undesired component of said radio signal from said predetermined location of coupling of said second transmission line to said first transmission line.

* * * * *